(12) United States Patent
Sharma

(10) Patent No.: US 9,426,091 B2
(45) Date of Patent: Aug. 23, 2016

(54) DISTRIBUTED SWITCH WITH CONVERSATIONAL LEARNING

(75) Inventor: Rajan Sharma, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 542 days.

(21) Appl. No.: 13/413,091

(22) Filed: Mar. 6, 2012

(65) Prior Publication Data

US 2013/0235881 A1    Sep. 12, 2013

(51) Int. Cl.
*H04L 12/933* (2013.01)

(52) U.S. Cl.
CPC ............ *H04L 49/10* (2013.01); *H04L 49/1507* (2013.01)

(58) Field of Classification Search
CPC .................................. H04L 45/44; H04L 45/08
See application file for complete search history.

(56) References Cited

U.S. PATENT DOCUMENTS

| | | | |
|---|---|---|---|
| 2005/0213561 A1* | 9/2005 | Yao ........................ | H04L 29/06 370/351 |
| 2005/0259646 A1* | 11/2005 | Smith ...................... | H04L 12/66 370/389 |
| 2005/0259649 A1* | 11/2005 | Smith ...................... | H04L 45/02 370/389 |
| 2006/0140185 A1* | 6/2006 | Norman .................. | H04L 45/00 370/389 |
| 2008/0240106 A1* | 10/2008 | Schlenk .............. | H04L 12/4625 370/392 |
| 2008/0240133 A1* | 10/2008 | Tanaka .................. | H04L 45/245 370/401 |
| 2011/0149986 A1* | 6/2011 | Sugawara ......... | H04L 12/40013 370/401 |
| 2012/0020373 A1* | 1/2012 | Subramanian .......... | H04L 45/58 370/419 |
| 2012/0033678 A1* | 2/2012 | Page ....................... | H04L 45/28 370/401 |
| 2012/0236859 A1* | 9/2012 | Subramanian ........ | H04L 45/245 370/392 |
| 2013/0028072 A1* | 1/2013 | Addanki ............... | H04L 49/557 370/218 |
| 2013/0051243 A1* | 2/2013 | Senthivel .............. | H04L 49/208 370/241.1 |
| 2013/0083797 A9* | 4/2013 | Narasimhan .......... | H04L 45/245 370/392 |
| 2013/0117605 A1* | 5/2013 | Ziegler .................... | H04L 69/40 714/15 |

OTHER PUBLICATIONS

Cisco Systems, Inc., "Cisco EtherChannel Technology", 2003, pp. 1-7.

* cited by examiner

*Primary Examiner* — Ayaz Sheikh
*Assistant Examiner* — Mariela Vidal Carpio

(57) ABSTRACT

A system includes a forwarding instance that is configured to receive a packet from a source on a port that is a member port of an etherchannel bundle. The forwarding instance is configured to update a table with information that correlates the source with the port. The forwarding instance is also configured to send a synchronization packet to other forwarding instances having ports that are member ports of the etherchannel bundle. Upon receipt of the synchronization packet, the other forwarding instances are configured to update tables with the information that correlates the source with the port.

14 Claims, 4 Drawing Sheets

DISTRIBUTED SWITCH WITH CONVERSATIONAL LEARNING

FIELD

The present embodiments relate to distributed switches and, more particularly, to optimizing distribution of media access control (MAC) update packets across distributed switches.

BACKGROUND

Network switches may include several line cards. Each line card may include one or more forwarding instances, which are configured to receive a packet and forward the packet to a destination on a port. The received packet may be sent from one forwarding instance to another forwarding instance if the other forwarding instance has the port on which the packet is to be sent.

DESCRIPTION OF EXAMPLE EMBODIMENTS

Overview

A system includes a first forwarding instance configured to receive a packet from a source on a first port, where the first port is a local port of the first forwarding instance. The system also includes at least one memory configured to have stored: first information that correlates the source with the first port, and second information that identifies a second port, where the second port is a peer port of the first port. The first forwarding instance is further configured to access the second information from the at least one memory; and send a message to a second forwarding instance that comprises the second port. The message including the first information and being sent in response to access of the second information.

Example Embodiments

The present disclosure describes a system that is configured for optimized distribution of a packet that is used to inform forwarding instances (FI) of source learning. The packet may be optimally distributed by sending the packet to only FIs that are part of an active conversation. The packet may be generated in response to reception of a second packet. The second packet may be sent from a source that is external to the system and was received on a port of a FI. When a FI receives the second packet on one of its ports, the FI sends the first packet to other FIs that have a peer port, and FI does not send the first packet to FIs that do not have a port that is a peer port and/or that only have non-peer ports. A peer port is a port that is part of the same etherchannel group or bundle to which the port that received the packet belongs. A non-peer port is a port that is not part of the same etherchannel group or bundle to which the port that received the packet belongs.

Figure 1:
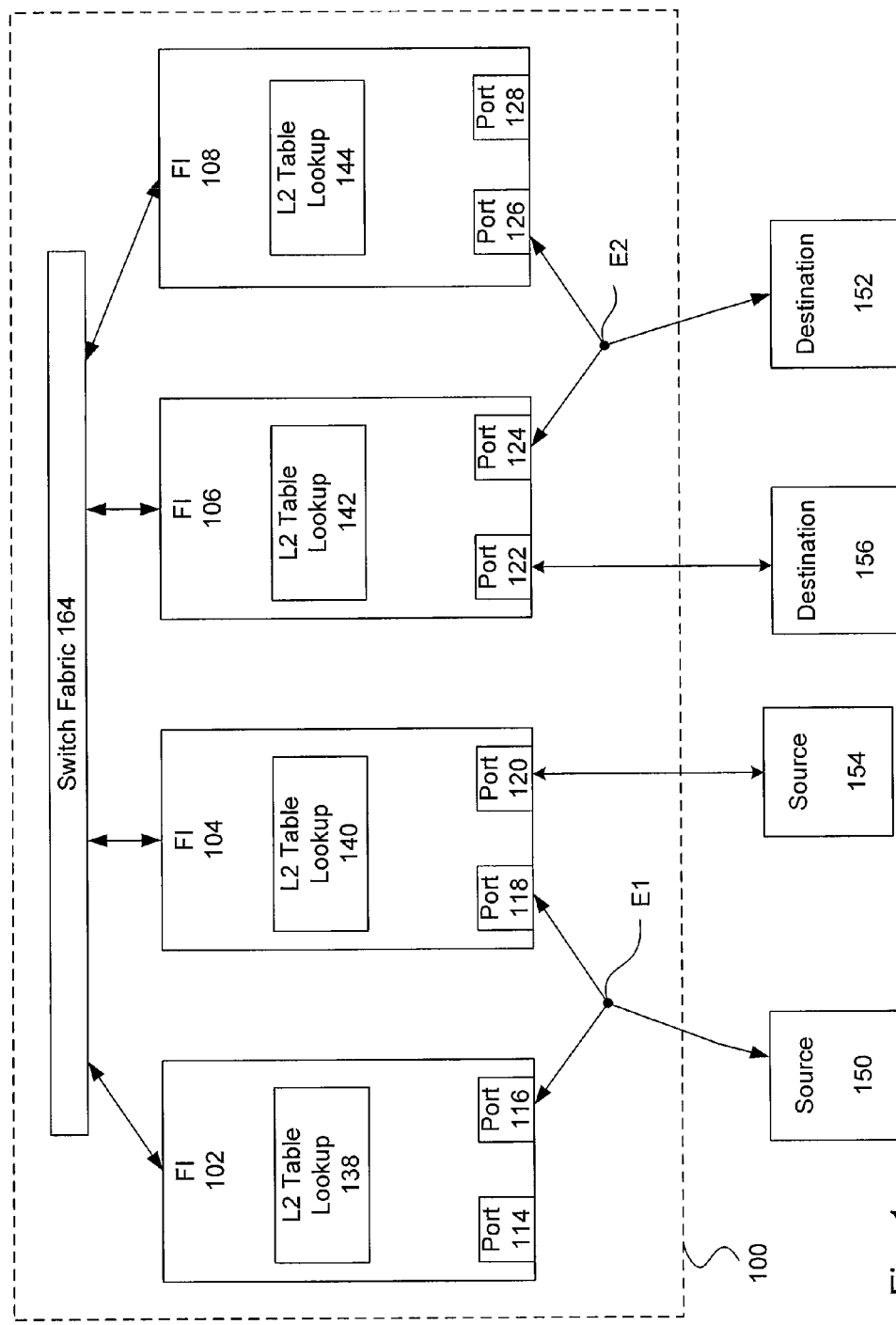
FIG. 1 illustrates an example system that includes multiple forwarding instances.

FIG. 1 shows an example system 100 that includes multiple forwarding instances (FI), including a first FI 102, a second FI 104, a third FI 106, and a fourth FI 108. The system 100 may be or may be part of a switch or bridge used in packet-switched network communications that is configured to receive a packet from a source and send the received packet to a destination. One or more of the FIs 102-108 may be included on a line card of the switch or bridge. In one example, each line card includes one FI. In other examples, multiple FIs may be included on a single line card. Various configurations are possible. Also, although the example system 100 includes four FIs 102-108, other example systems may include more or fewer FIs. In general, the system 100 may include at least two FIs.

Each FI 102-108 (also referred to as distributed switches) may be configured to receive a packet, such as from a source (such as source 150 or destination 152) that is external to the system 100 and/or from another FI via switch fabric 164, as described in more detail below. Each FI 102-108 may also be configured to determine where to send the packet and send the packet based on the determination. The determination of where to send the packet may be referred to as a forwarding decision. In addition, each FI 102-108 may include one or more ports on which packets may be received and/or transmitted. In the example system 100, each FI is configured to have two ports. The first FI 102 includes ports 114, 116, the second FI 104 includes ports 118, 120, the third FI 106 includes ports 122, 124, and the fourth FI includes ports 126, 128. In other configurations, one or more of the FIs 102-108 may include a single port, or alternatively more than three ports.

For a given FI, the ports of the FI may be referred to as local ports or associated ports, and the ports of another or different FI may be referred to as non-local or non-associated ports. Each FI 102-108 may be configured to receive packets from a source or send packets to a destination on its ports. The source and/or destination may be a network host that offers information resources, services, and/or applications. Alternatively, the source and/or destination may be a network switch or a network bridge. When a FI receives a packet on one of its ports, the FI may be configured to identify the source that sent the packet. The FI may identify the source by determining a source address (SA) of the source. The SA may be included in the received packet. In one configuration, the SA may be included in a header of the packet. The SA may be a Layer 2 address of Layer 2 (i.e., data link layer) of the Open Systems Interconnection (OSI) model. For example, the SA may be a Media Access Control (MAC) address of the source.

When the FI identifies the source, the FI may correlate and/or associate the source with the port on which the packet was received. Correlating and/or associating the source with the port on which the packet was received may be referred to as source learning. Additionally, the correlation and/or association of the source with the port on which the packet was received may be referred to as a learning event.

The FI may correlate and/or associate the source with the port on which the packet was received by recording information that correlates and/or associates the source with the port in a Layer 2 (L2) lookup table. When the information is recorded, the L2 lookup table may be considered updated. The information that correlates and/or associates the source with the port may include the SA of the source and an address that refers to and/or identifies the port on which the packet was received. The address that refers to and/or identifies the port on which the packet was received may be referred to as a source index (SI). In other example configurations, information other than the SA and/or the SI may be used to correlate and/or associate the source with the port. Also, before updating the L2 lookup table, the FI may access the L2 lookup table and/or perform a L2 table lookup to determine whether the source and the port are already correlated. For example, if the FI previously received a packet from the source, the FI may have previously updated the L2 lookup table. When the FI receives a packet, if the FI determines that the source and the port are already correlated and/or associated in the L2 lookup table, then the FI may determine not to update the L2 lookup table using the received packet.

A L2 lookup table may be associated with each FI 102-108 of the system 100. For example, a first L2 lookup table 138 may be associated with the first FI 102, a second L2 lookup table 140 may be associated with the second FI 104, a third L2 lookup table 142 may be associated with the third FI 106, and a fourth L2 lookup table 144 may be associated with the fourth FI 108. In other examples, one or more shared lookup tables that are associated with two or more of the FI's may be used.

Figure 4:
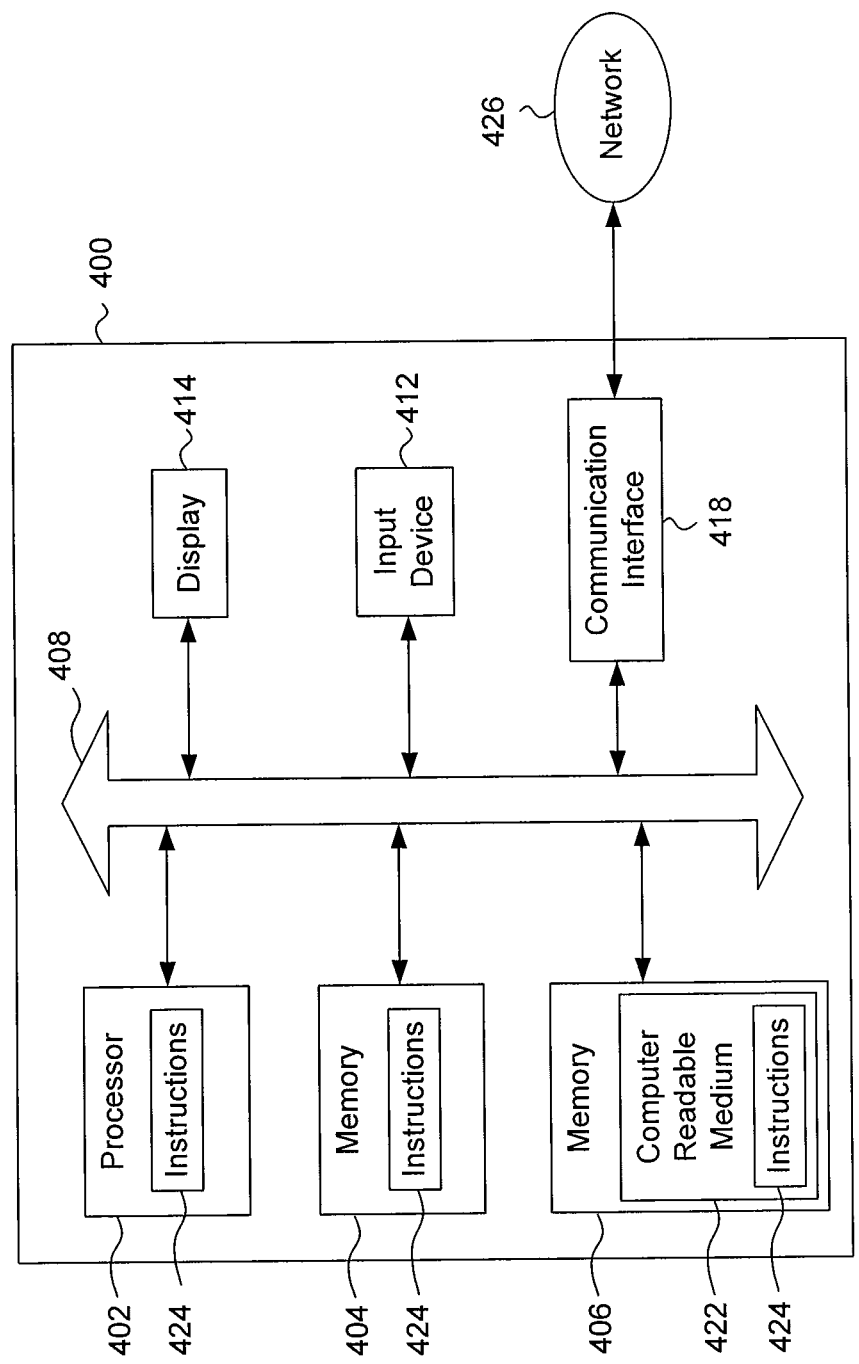
FIG. 4 is an example of a computer system that may be used for one or more components in the example system.

The L2 lookup tables 138-144 may be stored in memory, such as the memory 504 of the computer system 400 shown in FIG. 4. Also, the information that correlates and/or associates the source with the port may be recorded in the L2 lookup tables 138-144 by writing the information to the memory. In one example configuration, each of the FIs 102-108 may have a memory component, and each of the L2 lookup tables 138-144 may be stored in the memory of the FI 102-108 with which they are associated. Alternatively, the memory may be a component of the system 100 that is common to the FIs 102-108. The memory may be located in one of the FIs or at a location in the system 100 that is remote to each of the FIs 102-108. Various configurations are possible.

In addition, when a FI receives a packet on one of its ports, the FI may be configured to determine where to send the packet. To do so, the FI may be configured to identify the destination. The FI may identify the destination by determining a destination address (DA) of the destination. The DA may be included in the received packet. Like the SA, the DA may be a Layer 2 address, such as a MAC address, of Layer 2 (i.e., data link layer) of the OSI model. Also, to determine where to send the packet, the FI may be configured to determine a port on which the packet is to be sent to a destination. To determine the port, the FI may access a L2 lookup table associated with the FI and determine whether an entry in the L2 lookup table includes information that correlates and/or associates a port on which to send the received packet toward a destination with the DA included in the received packet. The L2 lookup table that includes information that correlates and/or associates a port on which to send the received packet toward a destination with the DA of the destination may be the same L2 lookup table as, or a different L2 lookup table than, the L2 lookup table that includes information that correlates and/or associates the source (SA) and the port (SI) on which the packet was received.

The information that correlates and/or associates a port with the destination may be an address that refers to and/or identifies a port on which the packet is to be sent. The address that refers to and/or identifies the port on which the packet is to be sent may be referred to as a destination index (DI) of the port.

In an initial situation, where the FI is configured to determine where to send the received packet for a first time, an entry correlating and/or associating the port with the DA may not be in the L2 lookup table. In that situation, the FI may not determine and/or determine that it does not know a port on which to send the packet. Not being able to determine and/or determining that the FI does not know where to send the packet may be referred to as a destination miss or a DA miss. Also, where the FI does not know the port on which to send the packet, the FI may be configured to send the packet to all of the other ports in the system. Sending the packet to all of the other ports in the system may be referred to as flooding the packet. Alternative flooding may include sending the packet to less than all of the ports where at least some of the ports are part of an etherchannel bundle. As explained in more detail below, where a packet is sent to an etherchannel bundle, the packet may be sent to only one of the ports of an etherchannel bundle.

To illustrate source learning and packet flooding due to a DA miss, the second FI 104 may receive a packet from a source 150 on port 118. The packet may include a SA of the source 150 and a DA of a destination (e.g., destination 152). The second FI 104 may access the second L2 lookup table 140 associated with the second FI 104 and determine whether the second L2 lookup table 140 includes information that correlates the source 150 and the port 118 (e.g., the SA of the source 150 and the SI of the port 118). If the second L2 lookup table 140 already includes the information, then the second FI 104 may be configured to not update the second L2 lookup table 140. Alternatively, if the second L2 lookup table 140 does not include the information, then the second FI 104 may be configured to update the second L2 lookup table 140 by recording the SA of the source 150 and the SI of the port 118 in the second L2 lookup table 140. The second FI 104 may also determine where to send the packet. The second FI 104 may be configured to access the second L2 lookup table 140 to determine if the second L2 lookup table 140 includes a DI correlated and/or associated with the DA included in the received packet. If the second L2 lookup table 140 includes a DI correlated and/or associated with the DA, then the second FI 104 may be configured to send the packet to the port correlated and/or associated with the DI. Alternatively, if the second L2 lookup table 140 does not include a DI correlated and/or associated with the DA, then the second FI 104 may be configured to flood the packet.

The FIs 102-108 may be configured to communicate with each other through and/or using a switch fabric 164 (otherwise referred to as switched fabric or switching fabric). Each of the FIs 102-108 may be connected to the switch fabric 164, and may communicate with each other through the switch fabric 164. For example, in the illustration above, when the second FI 104 determined to flood the packet, the second FI 104 may send the packet to the switch fabric 164, which sends the packet to the other FIs 102, 106, and 108.

In some configurations, before sending the packet to the ports in the system 100, the FI may be configured to modify the packet to include at least some information that correlates the source with the port on which it was received. For example, the FI may be configured to modify the packet to include the SI of the port. When the other FIs receive the packet, the other FIs may be configured to update their respective L2 lookup tables using the correlation and/or association information (e.g., the SI) included in the packet.

When an FI receives the packet from another FI, such as through the switch fabric 164, the FI may be configured to perform a L2 table lookup and/or access the L2 lookup table associated with the FI to determine if it knows the source and the port on which the packet sent by the source was received. For example, the FI may identify the SA and the SI included in the packet and determine if the SA and the SI is included in the L2 lookup table associated with the FI. If the FI determines that the SA and the SI is not included, then the FI may be configured to update the L2 lookup table associated with the FI with the SA and the SI. Alternatively, if the SA and the SI is included in the L2 lookup table associated with the FI, then other FI may determine not to update its lookup table.

In order to reduce and/or minimize the number of entries in a L2 lookup table, the FIs may be configured to selectively update their L2 lookup tables. That is, the FIs that receive a packet from another FI may be configured to not automatically update their respective L2 lookup tables every time the SA and correlated SI is not included in their respective lookup tables. Where the FIs are configured to selectively update their L2 lookup tables, the FIs may be configured to perform conversational learning. Where a FI is configured to perform conversational learning, the FI may be configured to update its L2 lookup table with the SA and the correlated and/or associated SI based on a determination of whether the DA included in the packet is associated with a local port of the FI. If the FI determines that the DA included in the packet is associated with a port that is local to the FI, then the FI may be configured to update its L2 lookup table with the SA and the correlated and/or associated SI. Alternatively, if the FI determines that the DA included in the packet is not associated with a local port, then the FI may be configured to not update its L2 lookup table (e.g., leave the L2 lookup table as unchanged).

To make the determination, an FI in receipt of a packet from another FI through the switch fabric 164 may be configured to perform a L2 table lookup. From the L2 table lookup, the FI may be configured to determine whether a DA included in the packet is associated with a local port. If the FI determines that the DA included in the packet is associated with a local port, then the FI may be configured to update its L2 lookup table with the SA and the correlated and/or associated SI. Alternatively, if the FI determines that the DA included in the packet is not associated with a local port, either by not identifying the DA in its L2 lookup table or by identifying the DA as being associated with a non-local port, then the FI may be configured to not update its L2 lookup table with the SA and the SI and/or leave the L2 lookup table unchanged.

By being configured to perform conversational learning, the FIs may be configured to update their respective L2 lookup tables based on whether they know if they are part of a conversation, such as a conversation between a source and destination. If the FI does know that it is part of the conversation, either by receiving a packet from a source on one of its ports or by determining that it has a local port correlated and/or associated with the destination, then the FI is configured to update its L2 lookup table. Otherwise, if the FI does not know that it is part of the conversation, such as by not being able to determine whether the DA included in the packet is correlated and/or associated with one of its local ports, then the FI may be configured to not update its L2 lookup table and/or leave its L2 lookup table unchanged.

To illustrate conversational learning, the second FI 104 may receive a packet from the source 150 on port 118 that includes a DA indicating that the packet is intended to be received by the destination 152. The second FI 104 may update the second L2 lookup table 140 with the SA of the source 150 that it identified from the received packet. The second FI 104 may also identify the port and/or the address of port 118 and update the L2 lookup table 140 with an SI of port 118 so that port 118 is associated in the L2 lookup table 140 with the SA of source 150. The second FI 104 may also be configured to modify the packet to include the SI of port 118. Also, the second FI 104 may determine that it does not know the port on which to send the received packet because the DA and a corresponding DI may not be in the L2 lookup table 140. In response, the second FI 104 may flood the modified packet by sending the modified packet to all of the other ports in the system 100.

Each of the FIs 102, 106, and 108 may be configured to receive the packet from the switch fabric 164. At this point, none of the other FIs 102, 106, 108 may know whether one of its local ports is correlated and/or associated with a DA included in the packet. As such, the other FIs 102, 106, 108 may be configured to not update and/or leave unchanged their respective L2 lookup tables 138, 142, 144 with the SA and the correlated and/or associated port number or SI. The packet may be sent out on the ports of the other FIs 102, 106, 108.

As shown in FIG. 1, the destination 152 may be in communication with port 124 of the third FI 106. Because the packet was flooded, the packet was received by the third FI 106 and sent out on port 124. The destination 152 may receive the packet, and in response, the destination 152 may send a reply packet to port 124 that is intended to be received by the source 150. The reply packet may include the address of the destination 152 (which is now considered the source address (SA)) and the address of the source 150 (which is now considered the destination address (DA)).

Upon receiving the reply packet, the third FI 106 may be configured to access the third L2 lookup table 142 and determine whether the address of the destination 152 and the index of port 124 are included in the third L2 lookup table 142. The third FI 106 may determine that the address of the destination 152 and the index of port 124 is not included, and in response, update the third L2 lookup table 142. The third FI 106 may also determine whether it knows the port on which the reply packet is to be sent to the source 150. Under conversational learning, because the third FI 106 did not update the third L2 lookup table 142 when it received the packet from the second FI 104, the third FI 106, upon receipt of the reply packet, may not know the port on which the reply packet is to be sent. In response, the third FI 106 may be configured to flood the reply packet. Before flooding the reply packet, the third FI 106 may be configured to modify the reply packet to include the index of port 124.

Because the reply packet was flooded, the FIs 102, 104, and 108 may be configured to receive the reply packet. Under conversational learning, the first FI 102 and the fourth FI 108 may each be configured to determine to leave unchanged and/or not update their respective L2 lookup tables 138, 144 with the address of the destination 152 and the index of port 124 because they may not determine that a port associated with the address of the source 150 is a local port. However, under conversational learning, the second FI 104 may be configured to update the second L2 lookup table 140 with the address of the destination 152 and the index of port 124 because the second FI 104 previously updated the second L2 lookup table 140 with the address of the source 150 and the SI of port 118. As a result, when the second FI 104 receives the reply packet from the third FI 106, the second FI 104 knows that the address (DA) of the source 150 included in the reply packet is associated with a local port of the second FI 104, namely port 118.

Subsequently, the second FI 104 may be configured to receive a second packet from the source 150 on port 118. The second FI 104 may be configured to perform a L2 table lookup and determine not to update and/or leave unchanged the second L2 lookup table 140 because the address of the source 150 and the index (SI) of port 118 are already included in the second L2 lookup table 140. In addition, the second FI 104 may be configured to identify the port (i.e., port 124) to which to send the second packet because the address (DA) of the destination 152 and the index (DI) of port 124 are included in the second L2 lookup table. In response to identifying port 124, the second FI 104 may be configured to send the second packet to port 124 of the third FI 106. The third FI 106 may be configured to receive the second packet, such as from the source fabric 164. Under conversational learning, the third FI 106 may be configured to update the third L2 lookup table 142 with the address of the source 150 and the index of port 118 because the port associated with the address of the destination 152 (i.e., port 124), is a local port of the third FI 106 and included in the third L2 lookup table 142. Because the addresses of the source 150 and the destination 152 and their respective associated ports 118 and 124 are now included in the second and third L2 lookup tables 140, 142, subsequent packets communicated between the source 150 and the destination 152 may be communicated to and from port 118 of the second FI 104 and port 124 of the third FI 106 without flooding the subsequent packets.

In some configurations, the example system 100 may be configured for etherchannel communication. In etherchannel communication, the system 100 may include one or more etherchannels. An etherchannel, also referred to as an etherchannel bundle, may include a group (e.g., a logical group) of two or more ports that are configured to function and/or behave as a single port from a forwarding point of view (e.g., a point of view of a source or destination that is forwarding a packet to a port, or a point of view of a FI that is forwarding a packet to another FI). The two or more ports making up the etherchannel bundle may be on the same FI, on different FIs, or a combination thereof. The ports that are part of the same etherchannel bundle may be member ports of the etherchannel bundle. Also, a port that is a member of the same etherchannel bundle as another port is a peer or peer port of the other port. In addition, an etherchannel bundle may be identified by a single index (e.g., a single DI). The etherchannel bundles may be predetermined during an initial configuration of the system 100.

In the example system 100, two etherchannel bundles are shown, a first etherchannel bundle (denoted by E1) that includes port 116 of the first FI 102 and port 118 of the second FI 104, and a second etherchannel bundle (denoted by E2) that includes port 124 of the third FI 106 and port 126 of the fourth etherchannel 108. In one configuration of etherchannel communication, a packet being sent to an etherchannel bundle may be sent to one of the ports of the etherchannel bundle, and not to more than one of the ports of the etherchannel bundle. To illustrate, the source 150 may send a packet to port 116 or port 118 of the first etherchannel bundle E1, but may not send the packet to both port 116 and port 118 of the first etherchannel bundle E1. Similarly, the destination 152 may send a packet to port 124 or port 126 of the second etherchannel bundle E2, but may not send the packet to both port 124 and port 126 of the second etherchannel bundle E2. Other configurations of etherchannel communication are contemplated, such as where a packet is sent to more than one but less than all of the ports of an etherchannel bundle. Various configurations are possible.

In addition, a FI that receives a packet may be configured to send the received packet to an etherchannel bundle for transmission to a destination. In one configuration of etherchannel communication, the FI may be configured to send the packet on one of the ports of the etherchannel bundle, but not to more than one of the ports of the etherchannel bundle. To illustrate, where the first FI 102 receives a packet from the source 150 on port 116 and the packet is to be sent to the destination 152, the first FI 102 may be configured to send the packet to either port 124 or port 126 of the second etherchannel bundle E2, but not to both port 124 and port 126 of the second etherchannel bundle E2. Similarly, where the fourth FI 108 receives a packet from the destination 152 on port 126 and the packet is to be sent to the source 150, the fourth FI 108 may be configured to send the packet to either port 116 or port 118 of the first etherchannel bundle E1, but not to both port 116 and port 118 of the first etherchannel bundle E1. Other configurations of etherchannel communication are contemplated, such as where a packet is sent to more than one but less than all of the ports of an etherchannel bundle. Various configurations are possible.

In some configurations, when a FI receives a packet and determines a port on which to send the packet to a destination, the FI may be configured to send the received packet to a FI that has a non-peer port. To illustrate, a packet may be received from the source 150 on port 118 of the second FI 104. The second FI 104 may be configured to send the packet to the destination 152 on port 124. Port 124 is a non-peer port of port 118 because it is not part of the first etherchannel bundle E1, as is port 118.

To determine which port of the etherchannel bundle to send the packet, the sender (e.g., the source, destination, or FI) may be configured to perform a hash operation. The sender may be configured to perform the hash operation prior to sending the packet. The hash operation may include accessing one or more hash-based port selection tables to determine and/or select a port to which to send the packet. The hash operation may be performed on one or more fields of the packet. In one example, a data field may include an address or index (e.g., a DI) of the etherchannel bundle. The hash operation may identify the ports making up the etherchannel bundle. For example, the hash operation may identify the ports associated with a DI. The hash operation may also identify the FI associated with each of the ports. In addition, the hash operation may identify which port of the etherchannel bundle to send the packet.

To illustrate, the source 150 may be configured to send a packet to the destination 152 via the first etherchannel bundle E1 and the second etherchannel bundle E2, as previously described. The first etherchannel bundle E1 may be identified and/or addressed with a first DI and the second etherchannel bundle E2 may be identified and/or address with a second DI. The packet being sent from the source 150 to the first etherchannel bundle E1 may include a data field that includes and/or is indicative of the first DI of the first etherchannel E1. Before sending the packet, the source 150 may be configured to perform a hash operation on the data field. Based on the hash operation, the source 150 may determine which of port 116 or port 118 of the first etherchannel bundle to send the packet. The source 150 may then be configured to send the packet to either port 116 or port 118 of the first etherchannel bundle E1 as determined by the hash operation.

Further, the FI receiving the packet from the source may be configured to identify the etherchannel bundle and/or the DI of the etherchannel bundle on which the packet is to be sent. The ports of the etherchannel bundle may be non-peer ports of the port that received the packet from the source. The FI may be configured to identify the DA included in the received packet and perform a L2 table lookup to determine a DI associated with the DA, which it learned through source learning as previously described. In the case of etherchannel communication, the DI may be and/or refer to an address of the etherchannel bundle, rather than an individual port. To illustrate, where the second FI 104 receives a packet from the source 150 on port 118, the second FI 104 may be configured to perform a L2 table lookup on the second L2 lookup table 140 and determine that a DI of the second etherchannel bundle E2 is associated with the DA included in the received packet.

As previously described, the second FI 104 may be configured to modify the received packet by including the DI in the packet. The second FI 104 may also be configured to determine which port of the second etherchannel bundle to send the modified packet. To do so, the second FI 104 may be configured to perform a hash operation on the data field that includes the DI of the second etherchannel bundle E2. Based on the hash operation, the second FI 104 may be configured to send the modified packet to either port 124 or port 126 of the second etherchannel bundle E2. The packet may then be sent to the destination on either port 124 or port 126.

In some configurations using etherchannel communication, an asymmetry may develop between the port of an etherchannel bundle to which the source or destination sends a packet and the port of the etherchannel bundle on which a FI sends a reply packet to the source or destination. To illustrate, suppose the source 150 sends a packet to port 118 of the second FI 104. The second FI 104, after performing a hash operation, may determine to send the packet out on port 124 to the destination 152. Then, in response to receiving the packet, the destination 152 may send a reply packet to a port of the second etherchannel bundle E2. To determine which port to send the reply packet to, the destination 152 may be configured to perform a hash operation. Based on the hash operation, the destination 152 may be configured to send the reply packet to port 126 of the fourth FI 108, rather than port 124 of the third FI 106. The result is an asymmetry because the packet was sent to the destination 152 on port 124 of the second etherchannel bundle E2, but the reply packet from the destination 152 was received on port 126 (i.e., a different port) of the second etherchannel bundle E2.

Upon receipt of the reply packet on port 126, the fourth FI 108 may be configured determine which port of the first etherchannel bundle E1 on which to send the reply packet to the source 150. To make the determination, the fourth FI 108 may be configured to perform a hash operation on the reply packet. Based on the hash operation, the fourth FI 108 may be configured to send the reply packet to the source 150 on port 116 of the first FI 102. As such an asymmetry may occur in that the port that received the packet from the source 150 (i.e., port 118) is different than the port on which the reply packet was sent to the source 150 (i.e. port 116).

As previously described, when a FI receives a packet on one of its ports, the FI may be configured to flood the packet if the FI determines that it does not know the port on which to send the packet to the destination. Also as previously described, in conversational learning, even though the packet is flooded, a FI receiving the flooded packet may not update its L2 lookup table if the FI is not able to determine whether a port correlated and/or associated with the DA included in the packet is one of its local ports. As a result, when asymmetry occurs, additional packet flooding may also occur due to learning not occurring because of the asymmetry.

To illustrate, the second FI 104 may receive a packet from the source 150 on port 118. The second FI 104 may update the second L2 lookup table 140 with the SA of the source and the SI of the first etherchannel bundle E1. The second FI 104, after being unable to identify a port on which to send the packet, may flood the packet. In one configuration, because ports 124 and 126 are part of the second etherchannel bundle E2, when flooding the packet, the packet is sent to only one of ports 124 and 126 after the second FI 104 performs a hashing operation on the packet. As previously described, under conversational learning, upon receipt of the packet, none of the other FIs 102, 106, 108 receiving the packet update their respective L2 lookup tables 138, 142, 144. The packet may be received by the destination 152 by being sent out on port 124 of etherchannel bundle E2, and in response, the destination 152 may generate a reply packet.

When asymmetry occurs, the destination may perform a hashing operation on the reply packet before sending the reply packet. In response to the hashing operation, the destination 152 may send the reply packet to port 126 of the second etherchannel bundle E2, rather than port 124. Upon receipt of the reply packet, the fourth FI 108 may be configured to update its L2 lookup table 144 with the address of the destination 152 (which may be included in the reply packet as the source address) and the index of the second etherchannel bundle E2. Under conversational learning, because the fourth FI 108 did not record the address of the source 150 and the index of the first etherchannel bundle E1, then the fourth FI 108 may be configured to flood the reply packet. In one configuration, because ports 116 and 118 are part of the first etherchannel bundle, the fourth FI 108 may be configured to send the reply packet to only one of ports 116 and 118 during flooding, and after performing a hashing operation. Where asymmetry occurs, the fourth FI 108 may determine to send the reply packet on port 116 after performing the hashing operation. Under conversational learning, because the first FI 102 and the third FI 106 did not update their respective L2 lookup tables when the second FI 104 flooded the packet received from the source 150, then the first FI 102 and the third FI 106 may also be configured to not update and/or leave unchanged their respective L2 lookup tables when receiving the flooded reply packet. However, because the second FI 104 updated its L2 lookup table 140 when receiving the packet from the source 150, then when the second FI 104 receives the flooded reply packet (e.g., because the flooded reply packet was sent to port 120), then in response to receiving the reply packet, the second FI 104 may be configured to update its L2 lookup table 140 with information correlating and/or associating the destination 152 (e.g., the address of the destination) and the second etherchannel bundle E2 (e.g. the index of the second etherchannel bundle E2).

The reply packet may be received by the source 150 by being sent out on port 116. The source 150 may be configured to send a second packet to port 118 of the second FI 104 for reception by the destination 152. Because the second FI 104 updated its L2 lookup table with information correlating the destination 152 and the second etherchannel bundle E2, the second FI 104 may be configured to send the second packet to the destination 152 on etherchannel bundle E2 without having to flood the second packet. Before sending the second packet, the second FI 104 may be configured to perform a hashing operation on the second packet to determine which of ports 124 and 126 of the second etherchannel bundle E2 on which to send the second packet. Based on the hashing operation, the second FI 104 may be configured to send the second packet to the destination 152 on port 124. In response, the destination 152 may send a second reply packet to port 126 of the second etherchannel bundle E2 for reception by the source 150. Because the fourth FI 108 did not previously record information that correlates the source 150 with the first etherchannel bundle E1, the fourth FI 108 may be configured to flood the second packet to the other ports of the system, which is the second time that the fourth FI 108 flooded a reply packet received from the destination 152. Subsequent flooding of packets received by the fourth FI 108 from the destination 152 may continue in a similar fashion and/or may persist as long as the L2 lookup tables are not updated in accordance with conversational learning.

To minimize flooding, an FI receiving a packet from a sender (e.g., the source 150, the destination 152, or a different FI in the system 100) may be configured to generate and/or send a synchronization packet to the other FIs in the system when the FI performs source learning and/or in response to a learning event. The synchronization packet may be sent to the other FIs to inform the other FIs of the learning event by the FI. The synchronization packet may include the information that correlates and/or associates the source sending a packet with the port on which the packet was received. When the other FIs receive the synchronization packet, the other FIs may be configured to update their respective L2 lookup tables with the correlation and/or association information. By initially receiving the synchronization packet, the other FI may be configured to know the port on which to send the reply packet when the other FIs receiving a packet from a sender.

The synchronization packet may be referred to as a MAC update packet (MUP). The MUP may be a modified version of the packet that was received from the sender. To generate the MUP, the FI may be configured to generate a copy of the received packet. The FI may also be configured to truncate the copy. The truncated copy may be a copy that includes the header of the packet and/or include the SA and the DA information. The copy may also be modified to include information that correlates and/or associates the packet with the port on which it was received, such as a SI of the port, as previously described. The MUP may also include instructions that instruct the other FIs receiving the MUP to update their respective L2 lookup tables with the information included in the MUP. In addition, the MUP may include information that instructs the other FIs not to send the MUP out on its ports and/or prevent the other FIs from sending the MUP out on its ports. By including the information not to send the MUP out on the ports, the MUP may be generated as a synchronization packet for internal use by the system 100, and not for reception and/or processing by sources and/or destinations that are remote from and/or external to the system 100. After the MUP is generated, the FI may be configured to send the MUP to one or more of the other FIs. Also, the MUP may be sent to one or more of the other FIs using the switch fabric 164.

When a FI receives the MUP, the FI may be configured to perform a L2 table lookup and/or access its L2 lookup table to determine if it knows the source and the port on which the packet sent by the source was received. For example, the FI may identify the SA and the SI included in the MUP and determine if the SA and the SI is included in the L2 lookup table associated with the FI. If the FI determines that the SA and the SI are not included, then the FI may be configured to update the L2 lookup table with the SA and the SI. Alternatively, if the SA and the SI is included in the L2 lookup table associated with the FI, then the FI may determine not to update its L2 lookup table.

To minimize the flooding of packets received from a source or destination (e.g., the source 150 and/or the destination 152), a FI may be configured to send a generated MUP to one or more of the other FIs in the system 100. In one configuration, the FI may be configured to flood a MUP by sending the MUP to all of the other FIs in the system. Alternatively, MUP flooding may be avoided and instead, the FI may be configured to identify and/or select the other FIs to which to send the MUP. The FI may then be configured to send the MUP to the other FIs that were identified and/or selected.

Where the example system 100 is configured for etherchannel communication, MUP distribution may be optimized and/or minimized by sending the MUP to FIs that have a port that is a peer port of a port on which a packet was received. In addition, if the port receiving the packet does not have any peer ports, then no MUP is generated. Using the illustration above, suppose the source 150 sends a packet to port 118 of the second FI 104. As previously described, port 118 is part of the first etherchannel bundle E1, along with its peer port 116. In response to receiving the packet from the source 150, the second FI 104 may be configured to perform a learning event and update its L2 lookup table 140 with information that correlates and/or associates the source 150 with the first etherchannel bundle E1. In response to the learning event, the second FI 104 may be configured to generate a MUP. After generating the MUP, instead of flooding the MUP, the second FI 104 may be configured to send the MUP to the first FI 102 because the first FI 102 has a port (i.e., port 116) that is a peer port of port 118. Upon receipt of the MUP, the first FI 102 may be configured to update its L2 lookup table 138 with the information correlating and/or associating the source 150 with the first etherchannel bundle E1.

Similarly, where the fourth FI 108 receives a reply packet from the destination 152 on port 126, the fourth FI 108 may be configured to perform a learning event and update its L2 lookup table 144 with information that correlates the destination 152 with the second etherchannel bundle E2. In response to the learning event, the fourth FI 108 may be configured to generate a MUP. After generating the MUP, the fourth FI 108 may be configured to send the MUP to the third FI 106 because the third FI 106 has a port (i.e., port 124) that is a peer port of port 126. Upon receipt of the MUP, the third FI 106 may be configured to update its L2 lookup table 142 with the information correlating and/or associating the destination 152 with the second etherchannel bundle E2.

In addition or alternatively, an FI may be configured to generate a MUP in response to a learning event performed upon receipt of a packet from another FI. To illustrate, suppose the second FI 104 sends the packet received from the source 150 to the third FI 106, via the switch fabric 164, to be sent out on port 124. Upon receipt of the packet, if the third FI 106 has information correlating the destination 152 and port 124 included in its L2 lookup table 142, then in accordance with conversational learning, the third FI 106 may be configured to perform a learning event and update its L2 lookup table 142 with the information correlating the source 150 with the first etherchannel bundle E1. In response to the learning event, the third FI 106 may be configured to generate a MUP. After generating the MUP, the third FI may be configured to send the MUP to the fourth FI 108 because the fourth FI 108 has a port (i.e., port 126) that is a peer port of port 124. Upon receipt of the MUP, the fourth FI 108 may be configured to update its L2 lookup table 144 with the information correlating and/or associating the source 150 with the first etherchannel bundle E1.

In order to determine which FIs to which to send the MUP, the example system 100 may be configured to store information identifying the member ports for an etherchannel bundle. The information may be stored in memory, such as memory 504 of the computer system 400 shown in FIG. 4. The memory may be a component of each of the FIs or may be a component of the example system 100 that is separate from one or more of the FIs.

In addition, the information may be stored and/or formatted as a table. Each port may have a corresponding and/or associated table. The table may identify ports in the example system 100 that are peer ports for a given FI. In one example, the information may include an index of the etherchannel bundle that addresses the member ports of the etherchannel bundle. In addition or alternatively, the table may identify one or more FIs that has a peer port as one of its local ports. To illustrate, a table corresponding and/or associated with port 118 may identify the first etherchannel bundle E1 having ports 116 and 118 as part of the bundle E1, may identify an index that addresses the first etherchannel bundle E1, may identify port 116 as a peer port of port 118, and/or may identify the first FI 102 as having port 116 as one of its local ports, as examples of information included in the table corresponding to port 118. Tables corresponding to other ports that are part of an etherchannel bundle may include similar information. In addition or alternatively, a port that is not part of an etherchannel bundle, such as ports 114, 120, 122, and 128 shown in FIG. 1 may correspond to an empty table or may not have a corresponding table.

To determine whether to generate a MUP and/or to determine where to send a generated MUP, the FIs may be configured to access the tables corresponding to the ports. The FIs may be configured to access the tables in response to and/or after a learning event. To illustrate, where the second FI 104 receives a packet from the source 150 on port 118 and subsequently updates its L2 lookup table 140 with the SA of the source 150 and the SI of port 118, the second FI 104 may then be configured to access the table corresponding to port 118. In response to accessing the table corresponding to port 118, the second FI 104 may be configured to determine whether to generate a MUP and/or to send the MUP to the first FI 102.

In addition, where a packet from a source is received on a port that is not part of an etherchannel bundle, no MUP may be generated. To illustrate, a source 154 may be configured to send a packet to port 120 of the second FI 104 for reception by a destination 156. As shown in FIG. 1, port 120 is not part of an etherchannel bundle. In response to receiving the packet on port 120, the second FI 104 may be configured to perform a learning event and update its L2 lookup table 140 with information correlating and/or associating the source 154 and 120. However, because port 120 is not part of an etherchannel bundle, the second FI 104 may be configured to not generate a MUP and/or send a MUP to other FIs in the system 100.

By sending MUPs to FIs having local ports that are peer ports, MUP distribution may be optimized while minimizing packet flooding. As previously described, without distributing MUPs, persistent, continual, and/or repeated flooding may occur due to asymmetry in the transmission and reception of packets when the FIs are configured for conversational learning. By sending MUPs to the peer ports, persistent, continual, and/or repeated flooding may be minimized and/or eliminated. To illustrate, using the example above, when the third FI 106 receives the second packet from the second FI 104, the third FI 106 may be configured to update its L2 lookup table 106 with information included in the second packet because the third FI 106 previously received a MUP from the fourth FI 108, causing the third FI 106 to update its L2 lookup table 142 with information correlating the destination 152 with the second etherchannel E2. In response to the learning event performed by the third FI 106, the third FI 106 may be configured to generate a MUP and send the MUP to the fourth FI 108. In response to receiving the MUP, the fourth FI 108 may be configured to update its L2 lookup table 144 with the information correlating and/or associating the source 150 with the first etherchannel E1, which was included in the MUP. Because the L2 lookup table 144 of the fourth FI 108 now includes information correlating and/or associating the source 150 with the first etherchannel E1, the fourth FI 108 may be configured to know that packets received on port 126 are to be sent out on the first etherchannel bundle E1. As a result, the fourth FI 108 may not flood packets received from the destination 152 on port 126.

Figure 2:
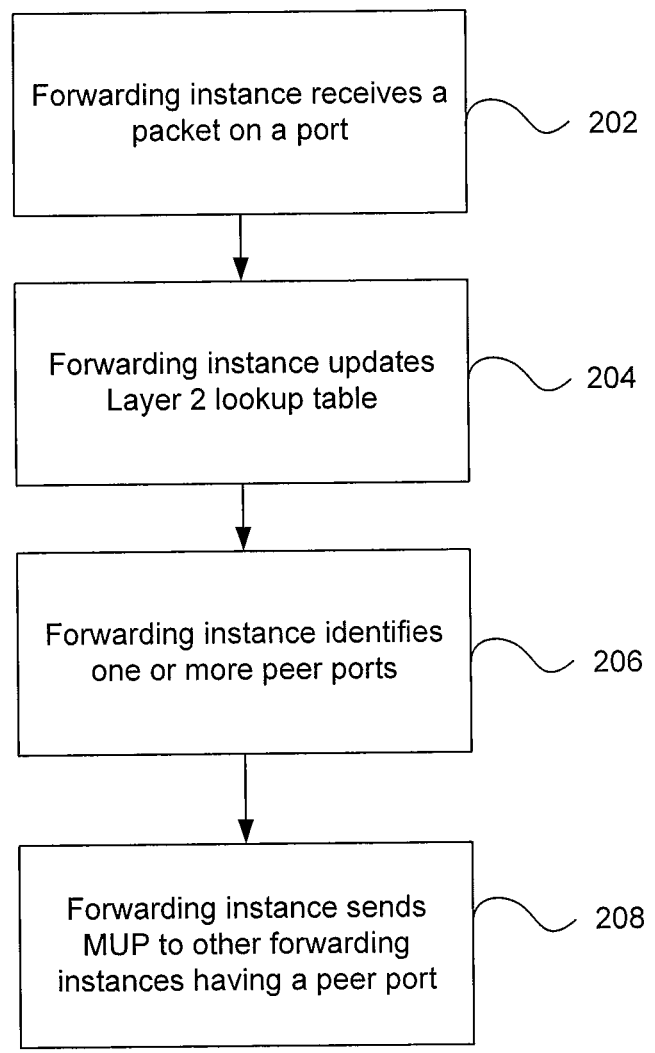
FIG. 2 illustrates a flow chart of an example method that may be used to optimize distribution of synchronization packets used to inform forwarding instances of a learning event.

FIG. 2 shows an example method 200 that may be used to optimize MUP distribution. At block 202, a forwarding instance may receive a packet from a source on a local port of the forwarding instance. At block 204, the forwarding instance may perform a learning event and update a L2 lookup table associated with the forwarding instance. At block 206, the forwarding instance may access a table corresponding with the local port to identify one or more peer ports and/or one or more FIs having the one or more peer ports as local ports. At block 208, the forwarding instance may generate a MUP and send the MUP to one or more forwarding instances having peer ports that were identified when accessing the table.

Figure 3:
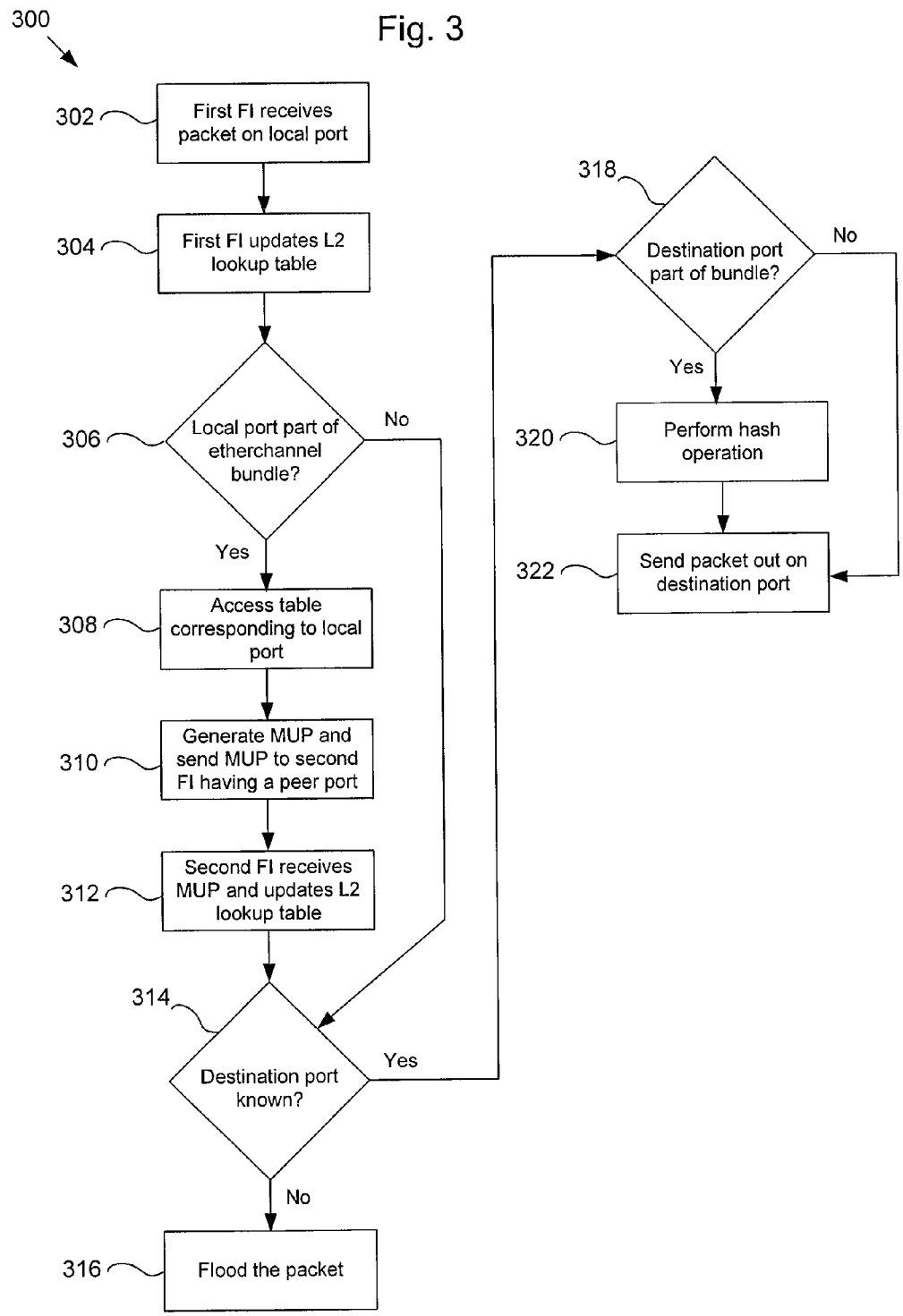
FIG. 3 illustrates a flow chart of a second example method that may be used to optimize distribution of synchronization packets used to inform forwarding instances of a learning event.

FIG. 3 shows another example method 300 that may be used to optimize MUP distribution. At block 302, a first forwarding instance may receive a packet from a source on a local port of the first forwarding instance. At block 304, the first forwarding instance may perform a learning event and update a L2 lookup table associated with the first forwarding instance. At block 306, the first forwarding instance may determine whether the local port is part of an etherchannel bundle. If the local port is not part of an etherchannel bundle, then the method may proceed to block 314. Alternatively, if the local port is part of an etherchannel bundle, then at block 308, the first forwarding instance may access a table corresponding to the local port and identify a port of a second forwarding instance that is a peer port of the local port. At block 310, the first forwarding instance may generate a MUP and send the MUP to the peer port located on the second forwarding instance. At block 312, the second forwarding instance may receive the MUP and update its L2 lookup table with the correlation and/or association information included in the MUP.

At block 314, the first forwarding instance may access its L2 lookup table and/or determine whether it knows a port on which to send the packet. If the first forwarding instance does not know the port on which to send the packet, then at block 316, the first forwarding instance may flood the packet. Alternatively, if the first forwarding instance knows the port on which to send the packet, then at block 318, the first forwarding instance may determine whether the port is part of an etherchannel bundle. If the port is not part of an etherchannel bundle, then the method may proceed to block 322, where the first forwarding instance may send the packet on the port to a destination. The port on which the packet is sent to the destination may be a non-peer port of the port on which the packet was received at block 302. Alternatively, if the port is part of an etherchannel bundle, then at block 320 the first forwarding instance may perform a hash operation on the packet to identify which port of the etherchannel bundle on which to send the packet. At block 322, the packet may be sent out on the identified port. As previously mentioned, the identified port may be a non-peer port of the port that received the packet at block 302.

The components of the system 100, including the first FI 102, the second FI, the third FI, the fourth FI, and/or the source 150, the destination 152, the source 154, and/or the destination 156 shown in FIG. 1 may be and/or may include a portion or all of one or more computing devices of various kinds, such as the computing device in FIG. 4. FIG. 4 illustrates an example of a general computer system designated 400. Any of the components from the system 100 shown in FIG. 1 may include a portion or all of the computer system 400. For example, in some examples, the computer system 400 may include only a processor and memory. The computer system 400 can include a set of instructions that can be executed to cause the computer system 400 to perform any one or more of the methods or computer based functions disclosed. The computer system 400 may operate as a standalone device or may be connected, e.g., using a network, to other computer systems or peripheral devices.

In a networked deployment, the computer system 400 may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular example, the computer system 400 can be implemented using electronic devices that provide voice, audio, video or data communication. Further, while a single computer system 400 is illustrated, the term "system" shall also be taken to include any collection of systems or sub-systems that individually or jointly execute a set, or multiple sets, of instructions to perform one or more computer functions.

In FIG. 4, the example computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The term "module" may be defined to include a plurality of executable modules. As described herein, the modules are defined to include software, hardware or some combination thereof executable by a processor, such as processor 402. Software modules may include instructions stored in memory, such as memory 404, or another memory device, that are executable by the processor 402 or other processor. Hardware modules may include various devices, components, circuits, gates, circuit boards, and the like that are executable, directed, and/or controlled for performance by the processor 402.

The computer system 400 may include a memory 404, such as a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 404 includes a cache or random access memory for the processor 402. In alternative examples, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described may be performed by the programmed processor 402 executing the instructions stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may or may not further include a display unit 410, such as a liquid crystal display (LCD), an organic light emitting diode (OLED), a flat panel display, a solid state display, a cathode ray tube (CRT), a projector, a printer or other now known or later developed display device for outputting determined information. The display 410 may act as an interface for the user to see the functioning of the processor 402, or specifically as an interface with the software stored in the memory 404 or in the drive unit 416.

Additionally, the computer system 400 may include an input device 412 configured to allow a user to interact with any of the components of system 400. The input device 412 may be a number pad, a keyboard, or a cursor control device, such as a mouse, or a joystick, touch screen display, remote control or any other device operative to interact with the computer system 400.

In a particular example, as depicted in FIG. 4, the computer system 400 may also include a disk or optical drive unit 416. The disk drive unit 416 may include a computer-readable medium 422 in which one or more sets of instructions 424, e.g. software, can be embedded. Further, the instructions 424 may embody one or more of the methods or logic as described. In a particular example, the instructions 424 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 424 or receives and executes instructions 424 responsive to a propagated signal so that a device connected to a network 426 can communicate voice, video, audio, images or any other data over the network 426. Further, the instructions 424 may be transmitted or received over the network 426 via a communication port or interface 420, and/or using a bus 408. The communication port or interface 420 may be a part of the processor 402 or may be a separate component. The communication port 420 may be created in software or may be a physical connection in hardware. The communication port 420 may be configured to connect with a network 426, external media, the display 410, or any other components in system 400, or combinations thereof. The connection with the network 426 may be a physical connection, such as a wired Ethernet connection or may be established wirelessly as discussed later. Likewise, the additional connections with other components of the system 400 may be physical connections or may be established wirelessly. The network 426 may alternatively be directly connected to the bus 408.

The network 426 may include wired networks, wireless networks, or combinations thereof. The wireless network may be a cellular telephone network, an 802.11, 802.16, 802.20, 802.1Q or WiMax network. Further, the network 426 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

In an example, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated hardware implementations, such as application specific integrated circuits, programmable logic arrays and other hardware devices, can be constructed to implement various modules or parts of modules included in the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing, such as cloud computing, can be constructed to implement various parts of the system.

The system is not limited to operation with any particular standards and protocols. For example, standards for Internet and other packet switched network transmission (e.g., Ethernet, TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A system comprising:
a first forwarding instance circuit comprising a port configured to receive a first packet from a source; and
at least one memory configured to store first information that identifies a correlation between the source and the port;
wherein the first forwarding instance circuit is configured to:
    determine to send a second packet to at least one second forwarding instance circuit comprising at least one first peer port of the port and not to send the second packet to at least one third forwarding instance circuit comprising a non-peer port of the port, wherein the second packet comprises the first information identifying the correlation between the source and the port and second information indicating to the at least one second forwarding instance circuit to update one or more associated tables with the correlation between the source and the port; and
    send the second packet to the at least one second forwarding instance circuit comprising the at least one first peer port; and
    send the first packet to the at least one third forwarding instance circuit;
wherein the at least one memory is further configured to store third information that identifies a second peer port, of the non-peer port, and wherein the at least one third forwarding instance is configured to:
send the first packet to a destination on the non-peer port;
determine that the non-peer port is associated with the destination and, in response thereto, update an associated second table with the correlation between the source and the port;
access the third information in response to update of the associated second table; and
send a third packet to a fourth forwarding instance circuit, the fourth forwarding instance circuit comprising the second peer port.

2. The system of claim 1, wherein the at least one second forwarding instance circuit is configured to:
receive the second packet from the first forwarding instance circuit; and
update the one or more associated tables with the correlation between the source and the port.

3. The system of claim 1, wherein the first forwarding instance circuit is further configured to:
truncate a copy of the first packet to generate the second packet, wherein the first information included in the second packet comprises an address of the source and an index of the port.

4. The system of claim 1, wherein the first forwarding instance circuit is further configured to:
perform a hash operation on the first packet to determine a port of an etherchannel bundle on which to send the first packet toward a destination.

5. The system of claim 1, wherein the first forwarding instance circuit is configured to determine to send the second packet to the at least one second forwarding instance circuit and not to send the second packet to the at least one third forwarding instance circuit in response to a learning event correlating the source with the port.

6. A method comprising:
receiving, on a port of a first forwarding instance circuit, a first packet from a source;

updating, with the first forwarding instance circuit, an associated first table with first information that correlates the source with the port;

in response to updating the associated first table, determining, with the first forwarding instance circuit, to send a second packet to at least one second forwarding instance circuit comprising at least one peer port of the port and to not send the second packet to at least one third forwarding instance circuit that does not comprise the at least one peer port of the port, wherein the second packet comprises first information identifying a correlation between the source and the port and second information indicating to the at least one second forwarding instance circuit to update one or more associated second tables with the correlation between the source and the port;

sending, with the first forwarding instance circuit, the second packet to the at least one second forwarding instance circuit comprising the at least one peer port;

sending, with the first forwarding instance circuit, the first packet to one of the at least one third forwarding instance circuit, wherein the one of the at least one third forwarding instance circuit comprises a non-peer port of the port;

receiving, with the one of the at least one third forwarding instance circuit, the first packet from the first forwarding instance circuit; and determining, with the one of the at least one third forwarding instance circuit, that the non-peer port is associated with a destination and, in response thereto, updating, with the one of the at least one third forwarding instance circuit, an associated third table with the first information correlating the source with the port; and in response to updating the associated third table, sending, with the one of the at least one third forwarding instance circuit, a third packet to a fourth forwarding instance circuit, wherein the fourth forwarding instance circuit comprises a second peer port of the non-peer port.

7. The method of claim 6, further comprising:
receiving, with the at least one second forwarding instance circuit, the second packet from the first forwarding instance circuit; and in response to receiving the second packet, updating, with the at least one second forwarding instance circuit, the one or more associated second tables with the correlation between the source and the port.

8. The method of claim 6, further comprising:
receiving, on the second peer port, a reply packet from the destination, the reply packet including an address of the source;

performing, with the fourth forwarding instance circuit, a hash operation to determine to send the reply packet to the source on one of the at least one first peer port;

receiving, with one of the at least one second forwarding instance circuit, the reply packet from the fourth forwarding instance circuit, wherein the one of the at least one second forwarding instance circuit comprises the one of the at least one first peer port;

performing, with the one of the at least one second forwarding instance circuit, a table lookup to determine that the one of the at least one first peer port is associated with the address received in the reply packet;

in response to determining that the one of the at least one first peer port is associated with the address received in the reply packet, updating, with the one of the at least one second forwarding instance circuit, an associated fourth table with third information that correlates the destination with the one of the at least one first peer port; and in response to updating the associated fourth table, sending, with the one of the at least one second forwarding instance circuit, a fourth packet to the first forwarding instance circuit, wherein the fourth packet comprises the third information.

9. The method of claim 6, further comprising:
generating, with the first forwarding instance circuit, a copy of the first packet; and
truncating, with the first forwarding instance circuit, the copy to generate the second packet.

10. The method of claim 6, further comprising:
storing, with at least one memory, third information that associates the at least one peer port with the at least one second forwarding instance circuit; and
accessing, with the first forwarding instance circuit, the third information to determine the at least one second forwarding instance circuit to which to send the second packet.

11. The method of claim 6, wherein the second packet further comprises third information that indicates to the at least one second forwarding instance circuit not to send the second packet on one or more ports of the at least one second forwarding instance circuit, wherein the one or more ports comprises the at least one peer port.

12. One or more non-transitory computer readable tangible storage media encoded with software comprising computer executable instructions, wherein the computer executable instructions comprises:

instructions executable by a first forwarding instance circuit to receive, on a port of the first forwarding instance circuit, a first packet from a source;

instructions executable by the first forwarding instance circuit to update an associated first table with first information that identifies a correlation between the source and the port;

in response to update of the associated first table, instructions executable by the first forwarding instance circuit to determine to send a second packet to at least one second forwarding instance circuit comprising at least one peer port that includes at least one first peer port and to not send the second packet to at least one third forwarding instance circuit that does not comprise the at least one peer port, wherein the second packet comprises the first information identifying the correlation between the source and the port and second information indicating to the at least one second forwarding instance circuit to update one or more associated second tables with the correlation between the source and the port;

instructions executable by the first forwarding instance circuit to send the first packet to one of the at least one third forwarding instance circuit comprising a non-peer port of the port;

instructions executable by the one of the at least one third forwarding instance circuit to receive the first packet from the first forwarding instance circuit;

instructions executable by the one of the at least one third forwarding instance circuit to determine that the non-peer port is associated with a destination;

in response to the determination that the non-peer port is associated with the destination, instructions executable by the one of the at least one third forwarding instance circuit to update an associated third table with the correlation between the source and the port; and in response to the update of the associated third table, instructions executable by the one of the at least one third forwarding instance circuit to send a third packet to a fourth forwarding instance circuit, wherein the fourth forwarding instance circuit comprises a second peer port of the non-peer port.

13. The one or more non-transitory computer readable tangible storage media of claim 12, wherein the computer executable instructions further comprises:
   instructions executable by the at least one second forwarding instance circuit to receive the second packet from the first forwarding instance circuit: and
   instructions executable by the at least one second forwarding instance circuit to update the one or more associated second tables with the correlation between the source and the port.

14. The one or more non-transitory computer readable tangible storage media of claim 12, wherein the second packet further comprises third information that indicates to the at least one second forwarding instance circuit not to send the second packet on one or more ports of the at least one second forwarding instance circuit, wherein the one or more ports comprises the at least one peer port.

\* \* \* \* \*